(12) United States Patent
Van Rens

(10) Patent No.: US 7,739,860 B2
(45) Date of Patent: Jun. 22, 2010

(54) DEVICE FOR PACKAGING ITEMS, IN PARTICULAR CONFECTIONERY

(75) Inventor: Joseph Johan Maria Van Rens, BK Weert (NL)

(73) Assignee: CFS Weert B.V. (NL)

( * ) Notice: Subject to any disclaimer, the term of this patent is extended or adjusted under 35 U.S.C. 154(b) by 6 days.

(21) Appl. No.: 11/911,293

(22) PCT Filed: Apr. 4, 2006

(86) PCT No.: PCT/EP2006/061314

§ 371 (c)(1),
(2), (4) Date: Sep. 10, 2008

(87) PCT Pub. No.: WO2006/108781

PCT Pub. Date: Oct. 19, 2006

(65) Prior Publication Data

US 2009/0241476 A1 Oct. 1, 2009

(30) Foreign Application Priority Data

Apr. 14, 2005 (NL) .................................... 1028769
Feb. 13, 2006 (NL) .................................... 1031139

(51) Int. Cl.
*B65B 11/48* (2006.01)
*B65B 49/12* (2006.01)

(52) U.S. Cl. .............................. 53/466; 53/461; 53/217; 53/227; 53/228; 53/594

(58) Field of Classification Search .................. 53/466, 53/463, 440, 127, 217, 227, 228, 234, 370, 53/594, 461
See application file for complete search history.

(56) References Cited

U.S. PATENT DOCUMENTS 1,809,358 A 6/1931 Savage (Continued)

FOREIGN PATENT DOCUMENTS

DE 4213830 A1 11/1993

(Continued)

OTHER PUBLICATIONS

International Search Report NLP174149A Dec. 14, 2005 (published as WO2006/108782).

(Continued)

*Primary Examiner*—Paul R Durand
(74) *Attorney, Agent, or Firm*—Dobrusin & Thennisch PC

(57) ABSTRACT

Device for packaging items, in particular confectionery, such as for example lollipops, comprising a packaging conveyor having a series of holders rotating along a movement path for holding each item and its associated packaging sheet securely during conveying, a feed station for feeding the items and the packaging sheets to the packaging conveyor and a discharge station for discharging the items packaged on the conveyor, the packaging conveyor being provided with means for closing the packaging sheet on the respective item and with a series of heat-sealing means co-rotating with the holders for heat-sealing the closed packaging by supplying heat, each of the heat-sealing means comprising a sheet gripper which is provided with a heating body, the device furthermore comprising means for heating each heating body and means for controlling the heating means, the control means being designed for controlling the heating means for each heating body.

21 Claims, 8 Drawing Sheets

U.S. PATENT DOCUMENTS

| | | | |
|---|---|---|---|
| 2,246,243 A | 6/1941 | Ross | |
| 2,705,857 A | 4/1955 | Fox et al. | |
| 3,038,635 A | 6/1962 | Rasmussen | |
| 3,741,698 A | 6/1973 | Caroli | |
| 3,851,440 A | 12/1974 | Horsky | |
| 3,987,605 A * | 10/1976 | Johnson | 53/234 |
| 4,008,812 A | 2/1977 | Stuart | |
| 4,130,936 A | 12/1978 | Cottrell | |
| 4,459,792 A * | 7/1984 | Derckx | 53/370 |
| 4,535,605 A | 8/1985 | Gram | |
| 4,539,790 A | 9/1985 | Zamboni | |
| 4,714,419 A | 12/1987 | Nielsen | |
| 4,729,501 A | 3/1988 | Lowrance | |
| 5,108,279 A | 4/1992 | Heckler et al. | |
| 5,117,613 A | 6/1992 | Pfaffmann | |
| 5,241,807 A | 9/1993 | Quick et al. | |
| 5,450,706 A * | 9/1995 | Latini | 53/397 |
| 5,519,981 A * | 5/1996 | Fukusaki | 53/370 |
| 5,826,403 A | 10/1998 | Haley | |
| 6,094,893 A * | 8/2000 | Draghetti et al. | 53/477 |
| 6,402,496 B2 | 6/2002 | Ishikawa et al. | |
| 6,633,480 B1 | 10/2003 | Herzog | |
| 7,210,916 B2 | 5/2007 | Korndorfer et al. | |
| 7,344,742 B2 | 3/2008 | Wray et al. | |
| 2007/0272089 A1 | 11/2007 | Asma | |
| 2009/0019820 A1 | 1/2009 | Asma | |

FOREIGN PATENT DOCUMENTS

| | | |
|---|---|---|
| DE | 19502562 | 8/1996 |
| DE | 19616989 | 10/1997 |
| DE | 10319829 | 11/2004 |
| EP | 0073535 A2 | 3/1983 |
| EP | 0616942 | 9/1994 |
| EP | 0950608 | 4/1998 |
| EP | 09050608 | 4/1998 |
| EP | 1041005 | 10/1998 |
| EP | 0742152 B1 | 8/1999 |
| EP | 0737619 B1 | 11/1999 |
| EP | 0956776 | 11/1999 |
| EP | 0842854 B1 | 3/2001 |
| EP | 1357063 | 3/2005 |
| GB | 328145 | 4/1930 |
| GB | 374653 | 6/1932 |
| GB | 406220 | 2/1934 |
| GB | 998643 | 7/1965 |
| GB | 1214983 | 12/1970 |
| GB | 2219725 | 12/1989 |
| GB | 2229347 | 9/1990 |
| GB | 2312411 A | 10/1997 |
| JP | 9039919 | 2/1997 |
| NL | 1028769 C2 | 10/2006 |
| WO | 0041573 | 7/2000 |
| WO | 03/086871 | 10/2003 |
| WO | 2004/066747 | 8/2004 |
| WO | 2004/113172 | 12/2004 |
| WO | 2005/041679 | 5/2005 |
| WO | 2006/108782 | 10/2006 |
| WO | 2006/136394 | 12/2006 |
| WO | 2007/121930 | 11/2007 |
| WO | 2007/134708 A2 | 11/2007 |

OTHER PUBLICATIONS

International Search Report WO2006/136394 Dec. 28, 2006.
Copending U.S. Appl. No. 12/301,111, filed Nov. 17, 2008, (also published as WO2007/134708).
Copending U.S. Appl. No. 10/578,812, filed Mar. 8, 2007, published as 2007/0272089.
International Search Report PCT/EP2006/061314 Jun. 20, 2006 (Published as WO2006/108781).
Preliminary Report on Patentability, PCT/EP2006/005965, date Oct. 5, 2007.
Preliminary Report on Patentability, PCT/EP2006/061314, date Oct. 16, 2007.
Preliminary Report on Patentability, PCT/EP2006/005965, date Dec. 21, 2007.
International Search Report PCT/EP2007/003455, published Nov. 1, 2007, published as WO2007/121930A1.
International Preliminary Report on Patentability, Dated Jul. 28, 2008, Application No. PCT/EP2007/003455.
Copending U.S. Appl. No. 11/911,295, filed Oct. 11, 2007, (W02006/108782).
Copending U.S. Appl. No. 11/933,129, filed Dec. 19, 2007, (WO2006/136394).
Copending U.S. Appl. No. 12/297,362, filed Oct. 16, 2008, (WO2007/121930).

* cited by examiner

DEVICE FOR PACKAGING ITEMS, IN PARTICULAR CONFECTIONERY

CLAIM OF BENEFIT OF FILING DATE

The present application claims the benefit of the filing date of PCT application Ser. No. PCT/EP2006/061314, (filed Apr. 4, 2006) (Published as WO 2006/108781); NL 1028769 (filed Apr. 14, 2005); and NL 1031139 (filed Feb. 13, 2006), the contents of which are hereby incorporated by reference in their entirety.

The invention relates to a device and a method for packaging items, in particular confectionery, such as lollipops.

It is known to package lollipops in sheets of packaging material, such as plastic film. In one embodiment, which is known as bunch-wrap packaging, the lollipops are held in stick clamps which are arranged on a rotatable drum. A sheet is positioned at the head side of the lollipops, then folded over and around the head and wrapped and heat-sealed on the stick side of the head. In this case, two rotatable arms provided with heated pressing ends, the arm ends, as well as a stick clamp which rotates the lollipop together with the folded sheet. The heating of the arms is effected by means of a supply conductor, which is connected by means of a movable coupling to a power supply which is fixed to the machine.

Furthermore, it is known, from WO-A-03/086871 by the applicant, to provide at least one of all arms with means for measuring the temperature on the heated arm ends. These measuring means, such as a PT100 element, are connected to a controller for the power supply for the arm ends in order to emit corresponding signals to the latter. In this manner, the actual temperature can be monitored and, on the basis thereof, the temperature on the arm ends can be adjusted to the desired set value. Preferably, only one pair of all pairs of arms is provided with measuring means, so that one measurement, which is representative for all the arms, is sufficient.

It is an object of the invention to provide a device and a method of the type mentioned in the preamble with which the heat-sealing of the packaging can be controlled to a large degree.

It is an object of the invention to provide a device and a method of the type mentioned in the preamble with which the heat-sealing of the packaging can be carried out with a substantially low degree of malfunction.

It is an object of the invention to provide a device and a method of the type mentioned in the preamble with which the heat-sealing of the packaging can be carried out in an efficient manner.

In order to achieve at least one of these objects, the invention provides, according to one aspect, a device for packaging items, in particular confectionery, such as for example lollipops, comprising a packaging conveyor, such as a rotatably driven drum, having a series of holders rotating along a movement path for holding each item and its associated packaging sheet securely while conveying, a feed station for feeding the items and the packaging sheets to the packaging conveyor and a discharge station for discharging the items packaged on the conveyor, the packaging conveyor being provided with means for closing the packaging sheet on the respective item and with a series of heat-sealing means co-rotating with the holders for heat-sealing the closed packaging by supplying heat, each of the heat-sealing means comprising a sheet gripper which is provided with a heating body, the device furthermore comprising means for heating each heating body and means for controlling the heating means, the control means being designed for controlling the heating means for each heating body separately.

By measuring the temperature of the heating means separately for each heating means and controlling the temperature on the basis of the separate measurement, it is possible to achieve a temperature which is as optimum as possible for each packaging step while taking individual circumstances into account. It is not necessary to use a single, possibly non-representative selection measurement for a plurality of heat-sealing means, as with the known device. This makes it possible to prevent differences in the quality of the closures of successive articles to a large degree.

In one embodiment, the control means are provided with a first memory for storing a desired value for the temperature of the heating bodies, the device furthermore comprising means for measuring the temperature of each heating body, the control means being designed for controlling the heating means for that heating body based on the result of a comparison between the desired value and the last measured value of a heating body.

In a further embodiment thereof, the control means comprise a control system and a second memory for discrete storage of values which are indicative of the historic state of the control system of a heating element, the control system being designed for controlling the heating means for said heating body based on the values for the historic state of the control system for the relevant heating body, the desired value and the last measured value of the relevant heating body. Thus, the reaction of that heating body to the heating can be taken into account when controlling the heating body, and therefore specific features of that heating body can be allowed for, such as a different weight.

In one embodiment, the control means comprise a separate control system for each heating body, which allows each heating body to be controlled in an optimum manner.

In one alternative embodiment, the control means comprise one control system for discretely and sequentially controlling the various heating bodies. When sequentially controlling the various heating bodies, it is thus possible to make considerable savings in the number of control systems. In one embodiment, the second memory is in this case designed for discrete storage of the values for the historic state of the control system for the various heating bodies, the second memory making the values of the historic state of each individual heating body sequentially available to the control system for sequentially controlling the various heating bodies.

In one embodiment, the measuring means are stationary relative to the movement path of the holders, in particular on the outside of this path.

The measuring means may be designed for contactless measurement of the temperature of the heating bodies. In one embodiment, the heating means are designed for contactless heating, from outside, of the heating bodies.

The heating means may be stationary relative to the movement path of the holders. In one embodiment, the heating means and the measuring means are placed at regular intervals along the movement path of the holders. This makes it possible to at least reduce a possible interference between the heating by the heating means and the temperature measurement by the measuring means.

In one embodiment, each sheet gripper with heating body can be moved between a non-operating position and an operating position, the heating means being arranged such that heat is supplied to the heating body when the sheet gripper is in the non-operating position. The measuring means may in this case be arranged such that they measure the temperature of the heating body when the sheet grippers are in the non-operating position.

The packaging conveyor may be provided with wrapping means for forming a twisted end section of the packaging sheet while packaging the respective item and the heat-sealing means are arranged such that they heat-seal the twisted section or an adjoining region of the packaging sheet by supplying heat. Such wrapping means and heat-sealing means may be provided for each holder, the wrapping means and heat-sealing means preferably being designed such that they can operate during conveying thereof through the packaging conveyor.

The sheet grippers may comprise pairs of clamping arms which are arranged on the packaging conveyor so as to be able to rotate about an individual rotation shaft, the path of the rotation shaft being situated at a shortest distance from the heating means which is smaller than the clamping arm length. The clamping arms can in this case be moved between an operating or clamping position directed at the rotation shaft and a projecting position or non-operating position directed away from the rotation shaft, the heating means being arranged in a section of the heat-sealing means, in which the clamping arms are in the projecting position, in which they extend preferably radially relative to the rotation shaft. In one embodiment, only one of the clamping arms is provided with a heating body.

The clamping arms may be rotatable about their rotation shaft in a direction counter to the direction of rotation of the packaging conveyor.

The heating means may comprise induction means for heating the heating body by means of induction. The induction means may comprise a stationary induction coil which is arranged in the movement path of the sheet gripper. The induction coil may be arranged such that the coil shaft is transverse to the movement path of the holders.

In one embodiment, the sheet gripper also forms part of the wrapping means.

The sheet gripper may be provided with a layer of heat-insulating material which protects the heating body in a direction other than the clamping direction.

In one embodiment, the holders are designed for holding lollipops provided with a stick and a head.

The sheet gripper may be arranged such that it operates on the side of the lollipop head facing the stick, such as for a bunchwrap machine.

If wrapping means and heat-sealing means are also positioned on the side of the head remote from the stick, the device is suitable for double twist-wraps.

According to a further aspect, the invention provides a device for packaging items, in particular confectionery, such as for example lollipops, comprising a packaging conveyor having a series of holders for holding each item and its associated packaging sheet securely during conveying, a feed station for feeding the items and the packaging sheets to the packaging conveyor and a discharge station for discharging the items packaged on the conveyor, the packaging conveyor being provided with means for closing the packaging sheet on the respective item and with a series of heat-sealing means co-rotating with the holders for heat-sealing the closed packaging by supplying heat, each of the heat-sealing means comprising a sheet gripper which is provided with a heating body, the device furthermore comprising means for heating each heating body as well as means for measuring the temperature of each heating body and means for controlling the heating means based on the measuring means, the measuring means being designed for contactlessly measuring the temperature of each heating body.

Thereby, the temperature can be measured without deformation and/or friction, thus making it possible to increase a fault-free period of operation.

According to a further aspect, the invention provides a device for packaging items, in particular confectionery, such as for example lollipops, comprising a packaging conveyor having a series of holders for holding each item and its associated packaging sheet securely during conveying, a feed station for feeding the items and the packaging sheets to the packaging conveyor and a discharge station for discharging the items packaged on the conveyor, the packaging conveyor being provided with means for closing the packaging sheet on the respective item and with a series of heat-sealing means co-rotating with the holders for heat-sealing the closed packaging by supplying heat, each of the heat-sealing means comprising a sheet gripper which is provided with a heating body, the device furthermore comprising means for heating the heating body of at least one of the heat-sealing means, as well as means for measuring the temperature of that heating body and means for controlling the heating means based on the measuring means, the measuring means being arranged in a stationary position relative to the packaging means.

Thus, the measuring means can be arranged, for example outside the moving parts of the packaging conveyor, which measuring means are generally accommodated on a rotation drum. Fewer components are required for measuring the temperature. Measuring the temperature can be effected in a relatively simple manner using relatively stationary components which are thus simpler and less susceptible to failure.

In this case as well, the measuring means may be designed for contactlessly measuring the temperature of the heating body.

According to a further aspect, the invention provides a device for packaging items, in particular confectionery, such as for example lollipops, comprising a packaging conveyor having a series of holders for holding each item and its associated packaging sheet securely during conveying, a feed station for feeding the items and the packaging sheets to the packaging conveyor and a discharge station for discharging the items packaged on the conveyor, the packaging conveyor being provided with means for closing the packaging sheet on the respective item and with a series of heat-sealing means co-rotating with the holders for heat-sealing the closed packaging by supplying heat, each of the heat-sealing means comprising a sheet gripper which is provided with a heating body, the device furthermore comprising means for heating each heating body and means for controlling the heating means, the control means being provided with a memory for storing a desired value of the temperature of the heating bodies, the device furthermore comprising means for measuring the temperature of each heating body, the control means furthermore comprising a memory for discrete storage of the measured values of the heating bodies, the control means being designed for controlling the heating means for that heating body based on the result of a comparison between the desired value and the last measured value of a heating body.

The aspects and measures described and/or shown in the application may, if possible, also be applied separately. These separate aspects, such as contactless heating of the sheet gripper and directional air heating, and other aspects may be the subject-matter of split patent applications specifically aimed at that.

The invention will be explained with reference to a number of exemplary embodiments illustrated in the attached drawings, in which.

Figure 1:
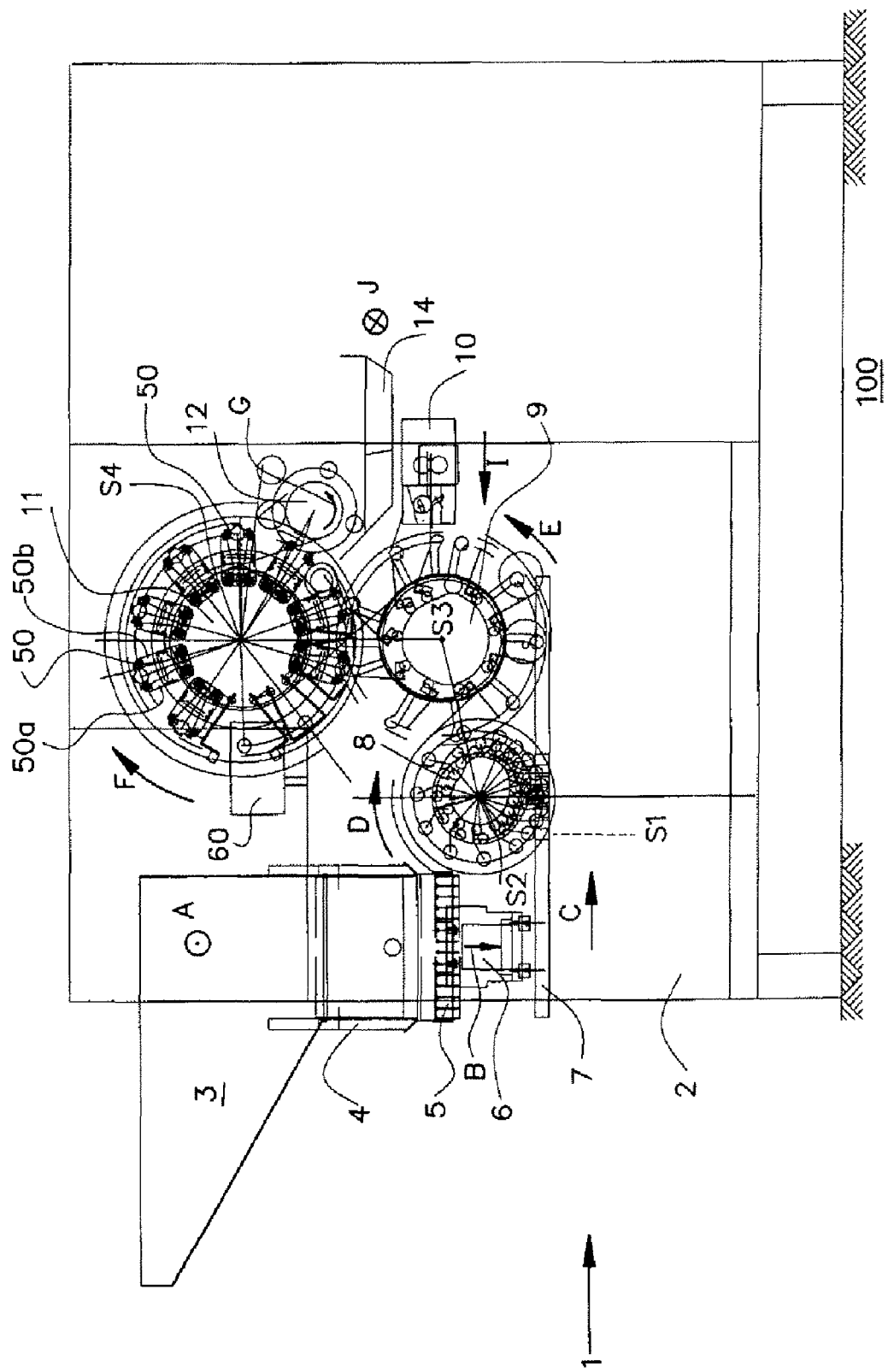
FIG. 1 shows a diagrammatic front view of a device for the double-twist packaging of lollipops, provided with a device according to the invention, in an exemplary embodiment.
Figure 2:
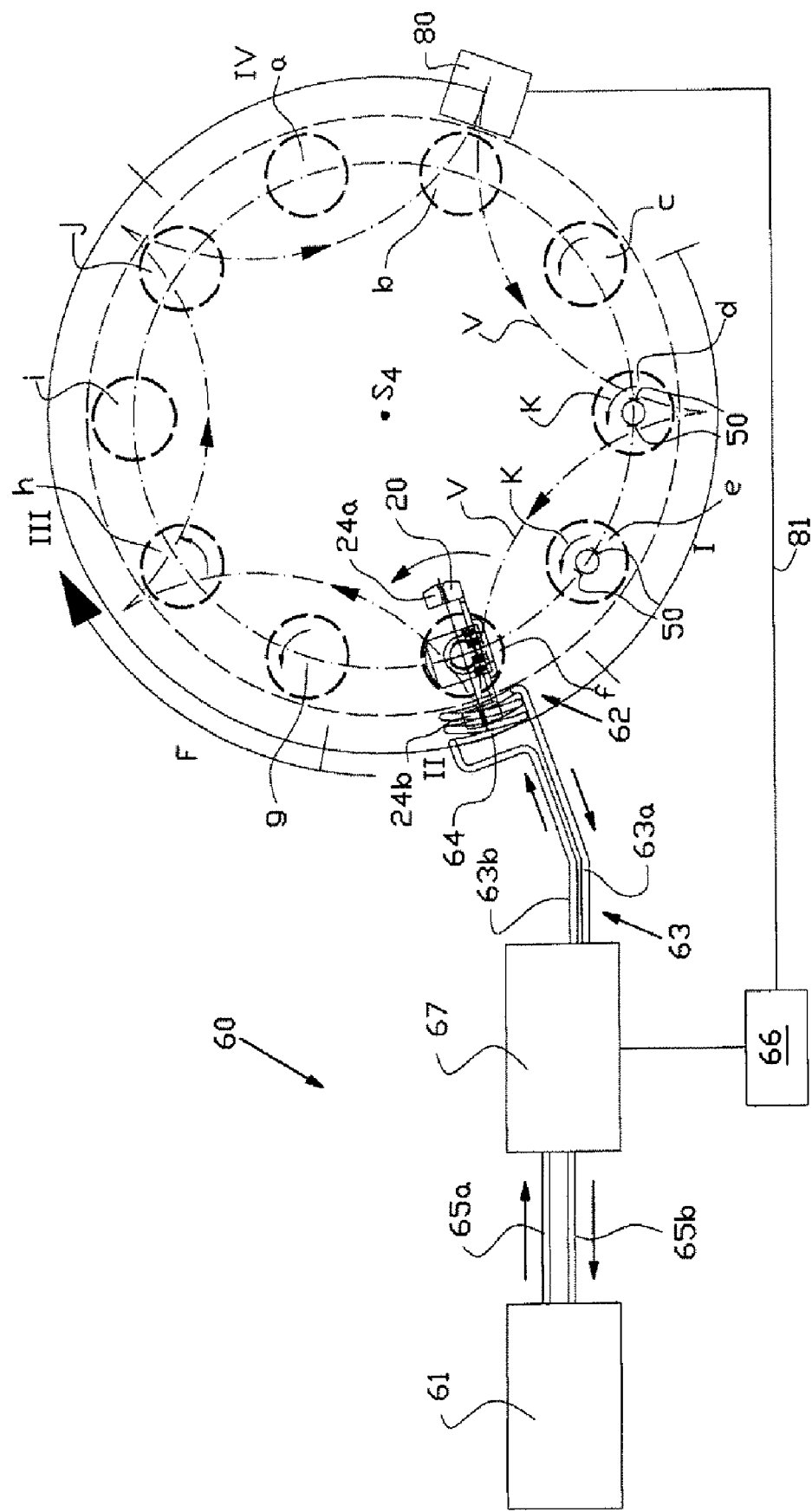
FIG. 2 shows a diagrammatic view of a measuring and heating device for the device from FIG. 1.
Figure 3A:
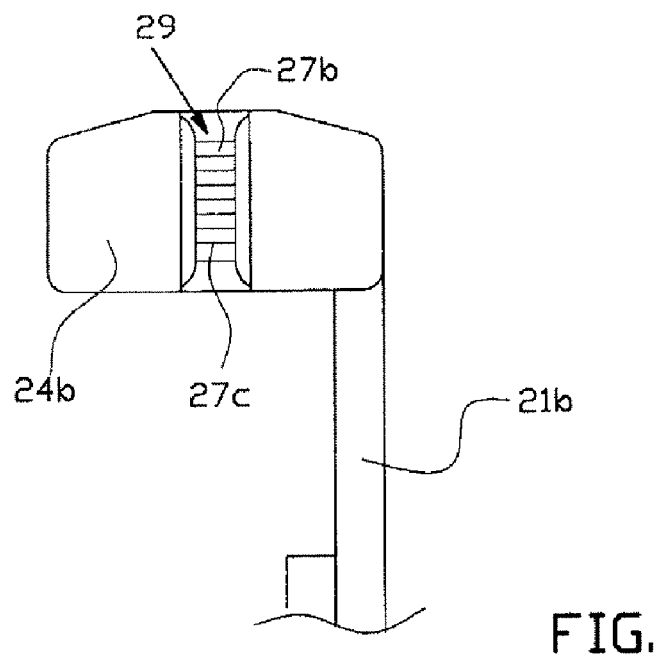
Figure 3B:
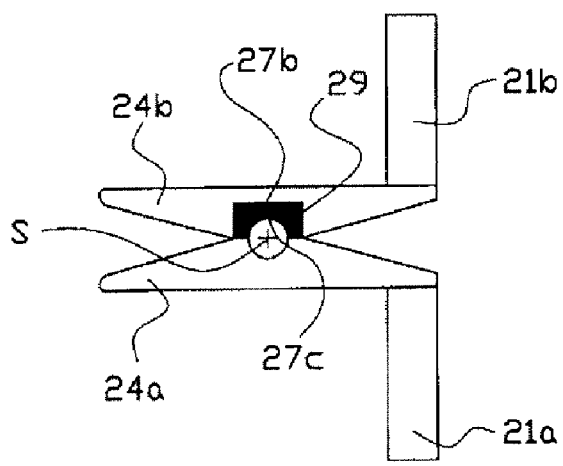
Figure 3C:
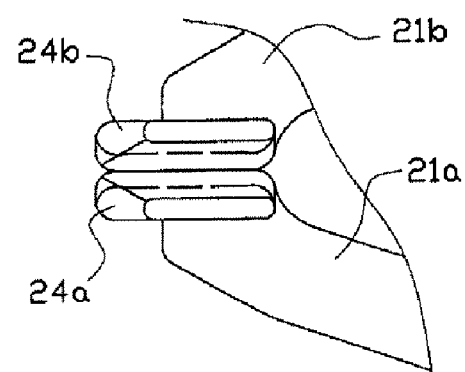
Figure 4:
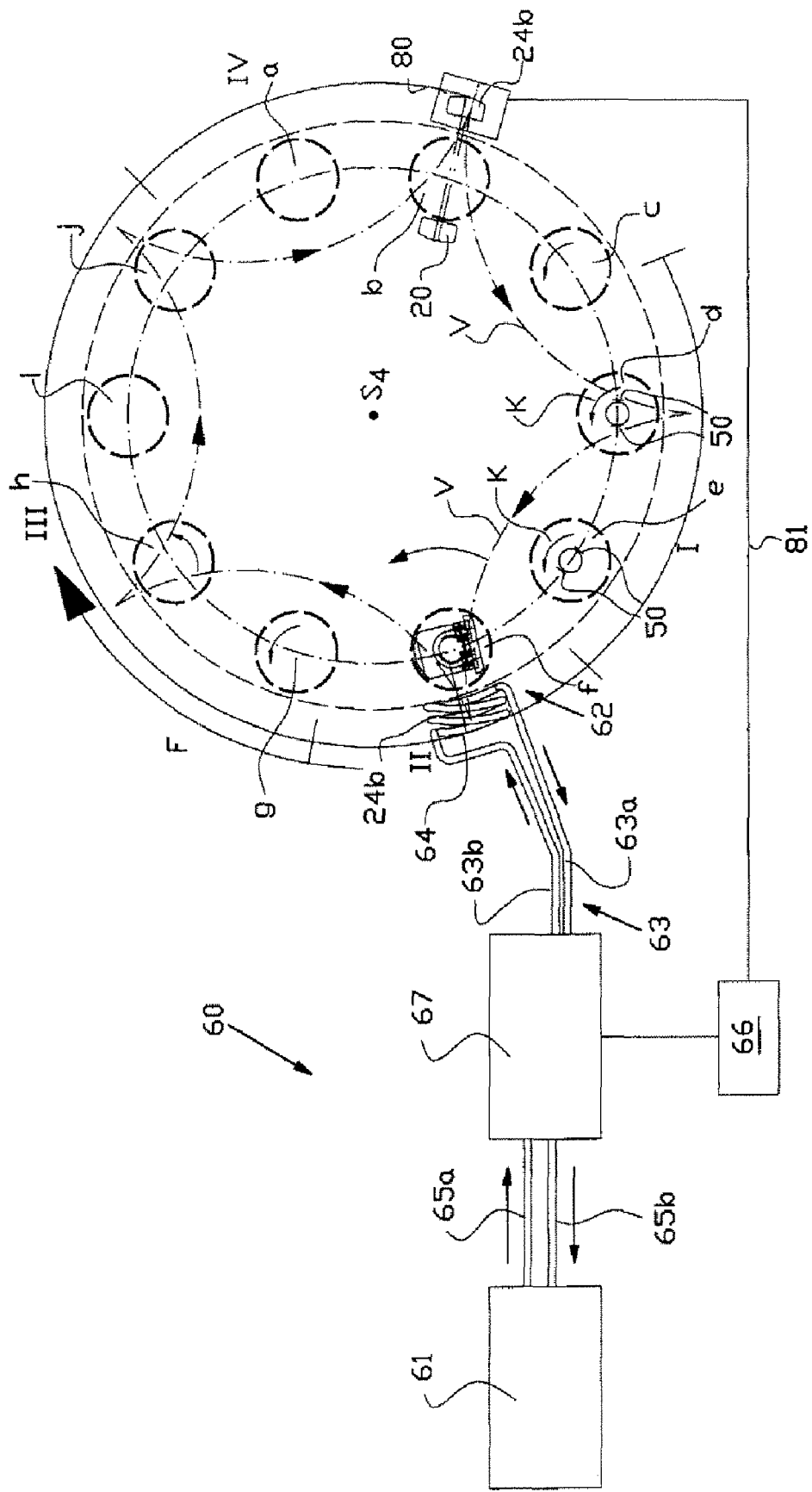
Figure 5A:
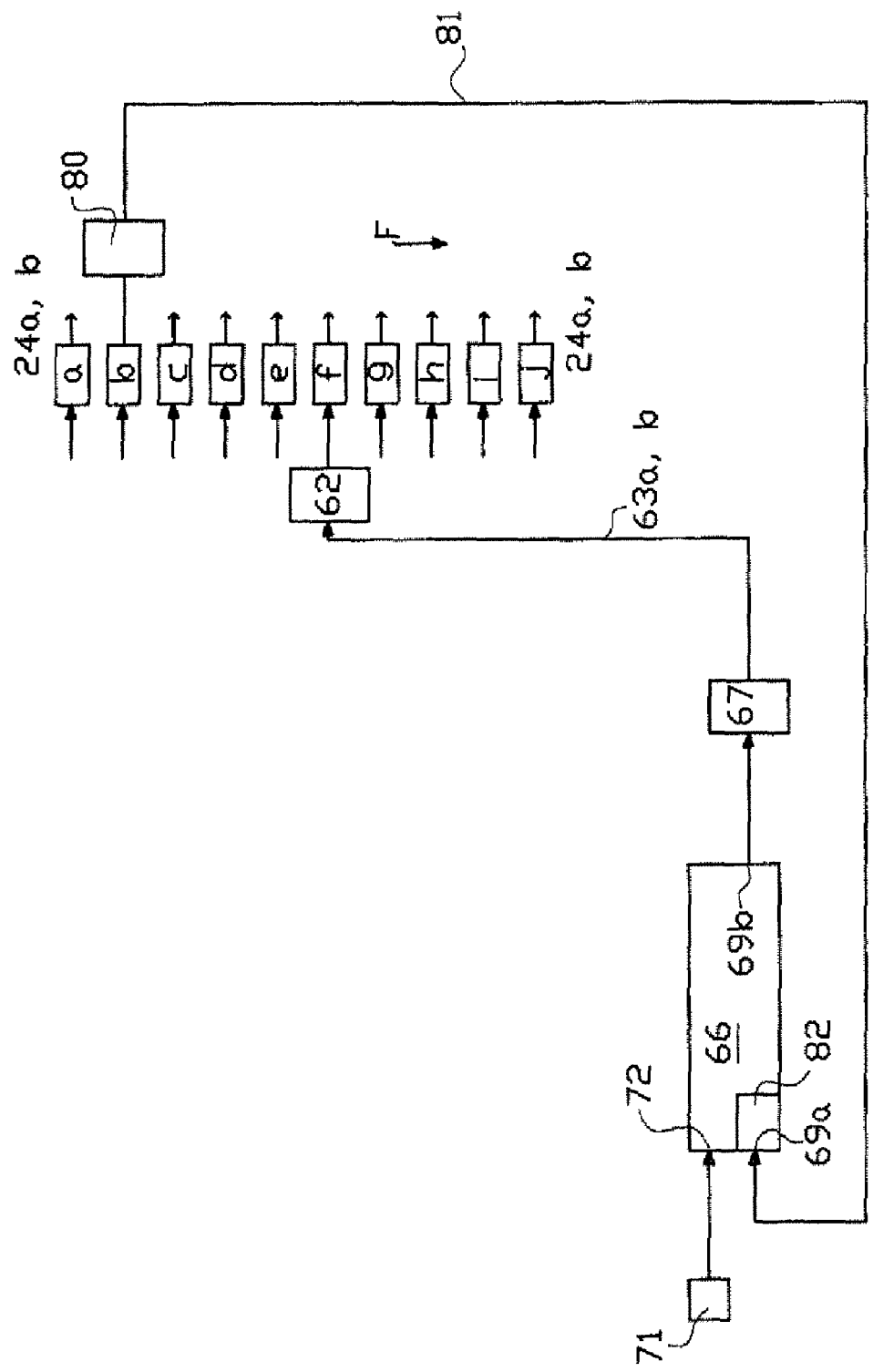
Figure 5B:
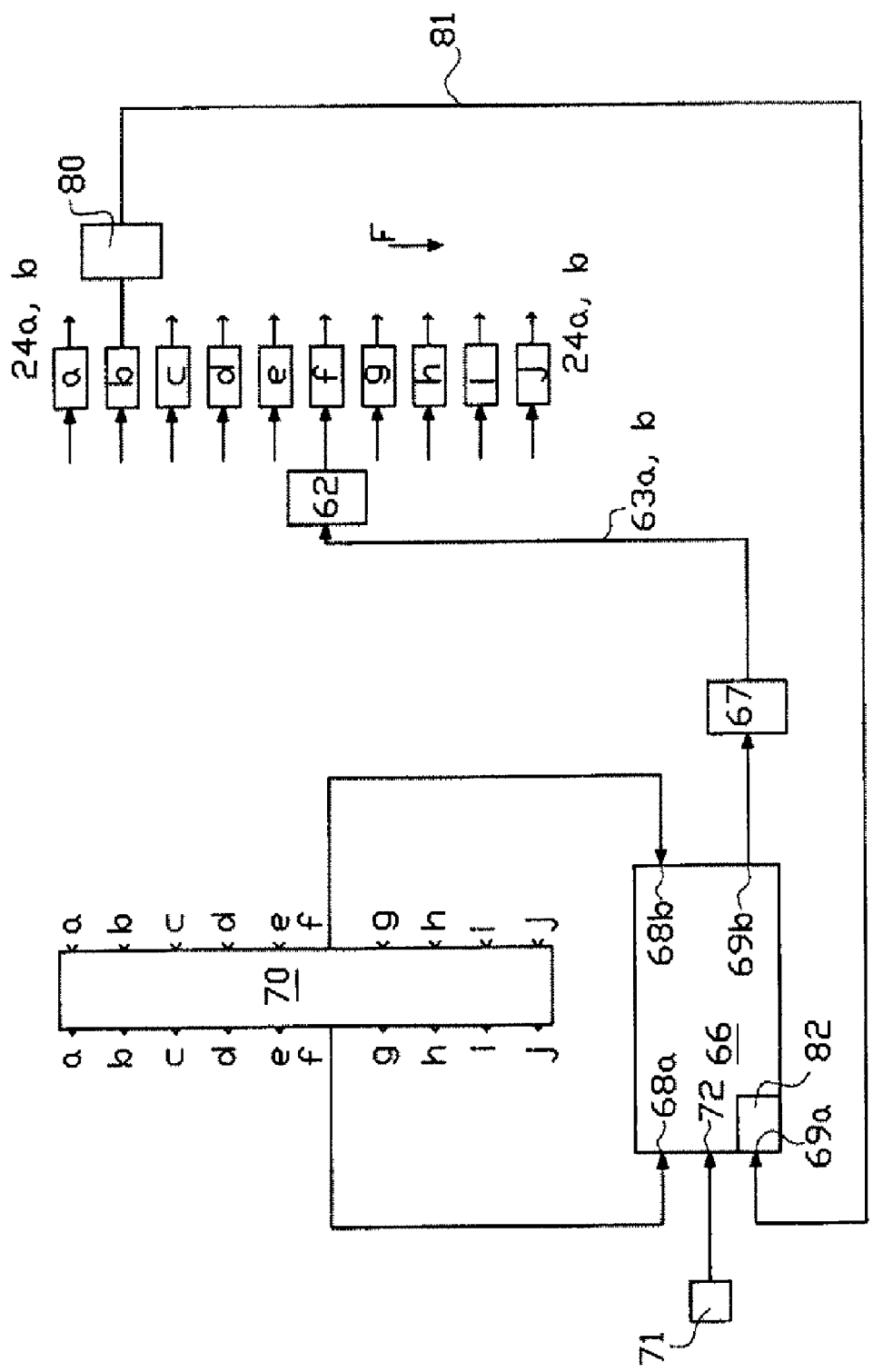

FIGS. 3A-C shows successive views in three directions of a twist clamp in the device from FIG. 1;

FIG. 4 shows a diagrammatic view of a measuring and heating device for the device according to FIG. 2; and FIGS. 5A and 5B show diagrammatic representations of two possible setups for the temperature measurement and heating control in the device from the preceding figures.

The packaging device 1 in FIG. 1 et seq. comprises a frame 2 which is placed on a base 100. The device 1 comprises a supply container 3 for lollipops provided with a stick and a head, supplied in bulk in the direction A. At its bottom end, the container changes into a passage which has a shaking slope 5/6 on its bottom side which passes the lollipops in a stream in the direction B to a distribution disc 7 rotatable in the direction C along a vertical centre line S1. The distribution disc 7 has a relatively large surface, on which the lollipops supplied in bulk can be spread out. The distribution disc 7 is provided on the edge with holding spaces for the head of the lollipops and with radially outwardly extending slots for the sticks thereof. The lollipops with lollipop sticks are brought into an orientation with the sticks directed radially outwardly and then retained with the aid of means (not shown), which are known per se. On the edge of the distribution disc 7, there is a second process wheel 8, which is rotatable in the direction D about a horizontal centre axis S2. Stick clamps are arranged on the second process wheel, which grasp the lollipops by their sticks and lift them from the distribution disc 7.

Downstream of the second process wheel 8, a third process wheel 9 is arranged which rotates in the direction E about the centre axis S3. A series of lollipop holders is arranged on the third process wheel 9, at each of which a film/foil sheet clamp is positioned. A film/foil feed station 10 is positioned at the third process wheel 9, in which a roll of film/foil sheet material can be placed and unwound and can be cut into separate sheets $F_1$, delivered intermittently to the third process wheel 9.

Downstream of the third process wheel 9, viewed in processing direction, a fourth process wheel 11 is disposed, which is rotatably driven in the direction F about the centre axis S4. The fourth process wheel 11 is provided with a series of co-rotating lollipop holders 50 and a series of co-rotating wrappers, as well as heat-sealing means for heat-sealing the two twisted ends of the film/foil packaging sheet on the lollipop.

Lollipops packaged in the fourth process wheel 11 are passed on to a discharge wheel 12, which rotates in the direction G and can deliver the lollipops to a discharge 14 in order for them to be discharged in the direction J.

Figure 1A:
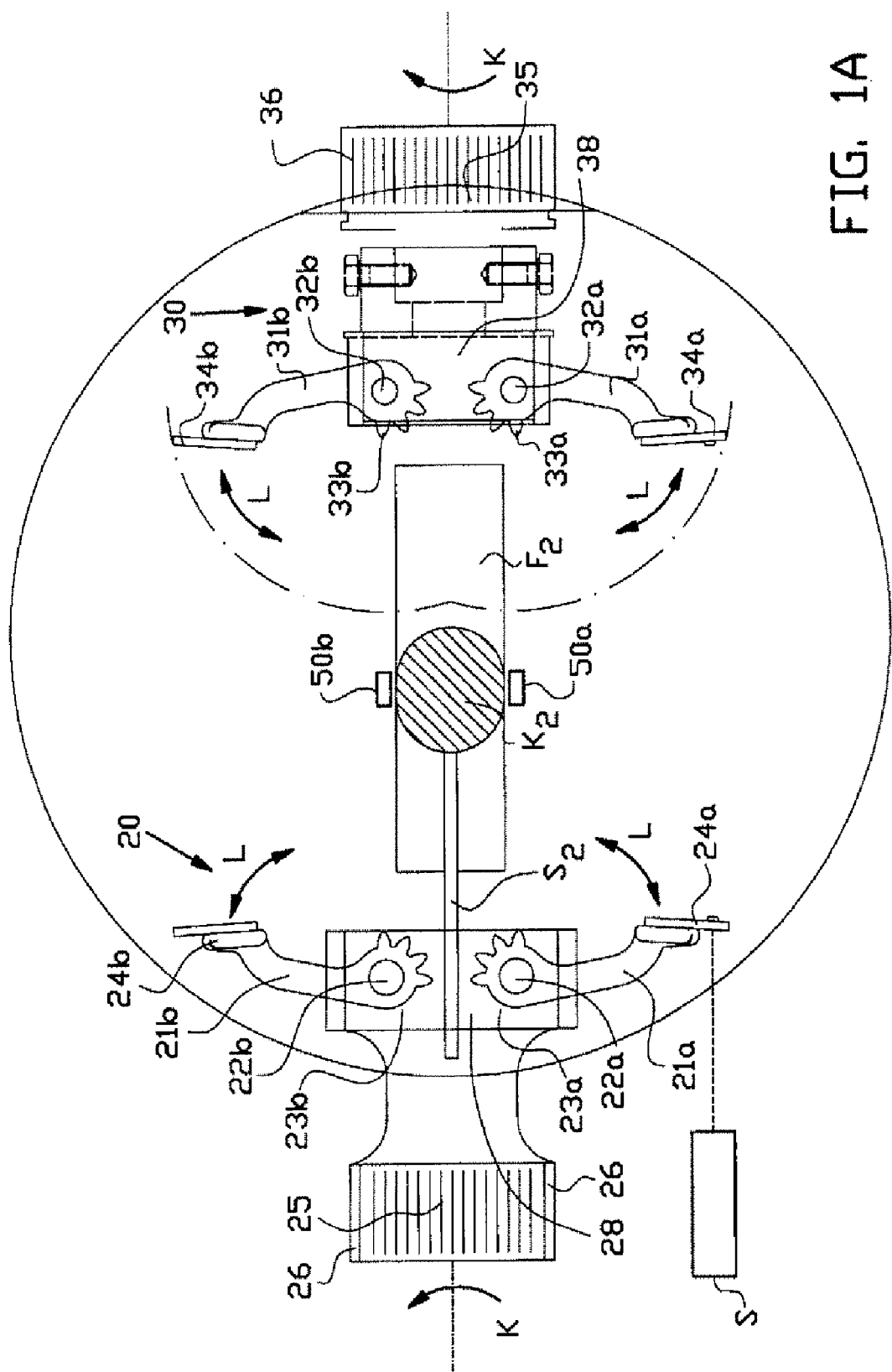
FIG. 1A shows a diagrammatic side view of a unit for double-twist packaging a lollipop in the device from FIG. 1.

In FIG. 1A, one of the pairs of wrappers 20/30 of the fourth process wheel 11 is illustrated in side view. It will be understood that the fourth process wheel 11 is situated at right angles to the plane of the drawing, the illustrated lollipop L with the stick $S_1$ being situated parallel to the centre axis S4.

The lollipop holders 50 are illustrated diagrammatically and are clamped radially on the lollipop head $K_1$ by means of clamping jaws 50a, 50b while clamping the film/foil sheet $F_1$ present in tubular form in between. The longitudinal seam of the film/foil sheet runs parallel to the stick $S_1$.

The left-hand wrapper 20 comprises a holder 28 with two arms 21a, 21b, which are pivotably attached to the holder 28 at 22a, 22b and are provided with toothings 23a, 23b at that end. In a manner known per se, these toothings are in engagement with a toothed rack (not shown), which can be moved to and fro in the direction parallel to the stick $S_1$. As a result of this movement, the arms 21a, 21b will rotate in the direction L, between a radially projecting, non-operating position, illustrated in the figure, and a closed, operating position.

At their ends, the wrapping arms 21a, 21b are provided with clamping panels 24a, 24b, with which a film/foil tube can be clamped flat.

The wrapper 30 is constructed in a similar way and has a holder 38 with two wrapping arms 31a, 31b, which are pivotably attached to the holder 38 at the location of pivots 32a, 32b, and are there provided with toothings 33a, 33b, which engage again in a toothed rack in a manner known per se, which toothed rack can be moved to and fro in a direction parallel to the stick $S_1$.

At their ends, the wrapping arms 31a, 31b are provided with clamping panels 34a, 34b, with which a film/foil tube can be clamped flat.

Figure 2A:
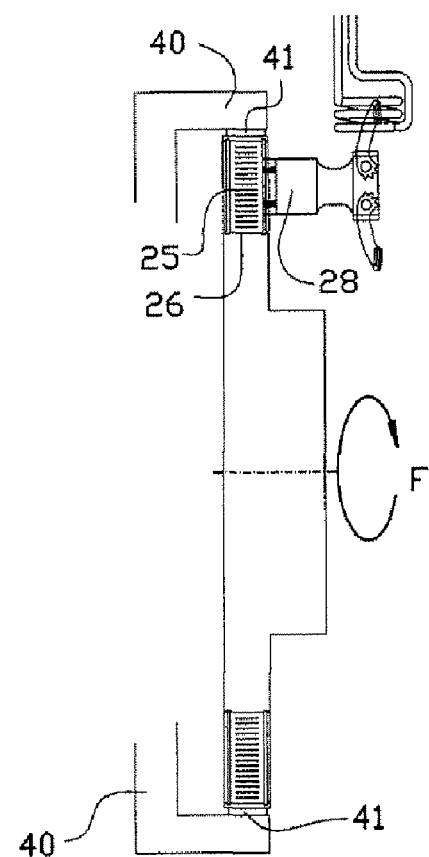
FIG. 2A shows a cross section of the illustration in FIG. 2.

Both holders 28, 38 are rotatable in the direction K, about a centre axis parallel to the stick $S_1$, and to this end are provided with toothed wheels 25, 35, the teeth 26, 36 of which are in permanent engagement with an inner toothing 41 on a fixedly arranged ring 40, see FIG. 2A (for toothed wheel 25: toothed wheel 35 is driven in a similar fashion).

The holders 28, 38 are mounted so as to be rotatable about their centre axes in the rotating section of the fourth process wheel 11. During rotation of the fourth process wheel 11, the teeth 26, 36 of the toothed wheels 25, 35 will therefore run along the fixed annular toothing 41, so that the holders 28, 38 and thus the wrappers 20, 30 are rotated in the direction K.

If the twisting arms 21a, 21b remain in the projecting position, they will follow a garland-like path V during the rotation, as is illustrated diagrammatically in FIG. 2. In the radially outermost positions, there will be a short moment where they will not move in the peripheral direction, but instead their radially outward movement will change into a radially inward movement. It should be noted that the number of such turning positions can be larger or smaller, depending on the ratio of the diameter of the toothings 41 and 26, 36.

As can be seen in FIG. 2, a coil 62 is arranged at the location of one of these turning positions of arms 21b. This coil 62 forms part of a heating device 60, placed in a stationary position near the fourth process wheel 11, as illustrated diagrammatically in FIG. 1.

The coil 62 forms part of an induction heating device 60, illustrated in more detail in FIG. 2, comprising an induction heating unit 67, controlled by a control unit 66, from where a tube 63a,b runs which forms a coil 62 with turns 64. The coil 62 is directed exactly radially relative to the fourth process wheel 11. The tube 63 is made of copper, electrically conductive material, and is of hollow construction, so that a coolant flow can run via tube leg 63a, the coil 62 and back via tube leg 63b. The tubes 63a, 63b continue on the other end of the induction device 60, with tubes 65a, 65b, which lead to an induction device 61, where the coolant is cooled in the tube. The cooling unit 61 is electrically insulated from the induction heating unit 67.

Figure 2B:
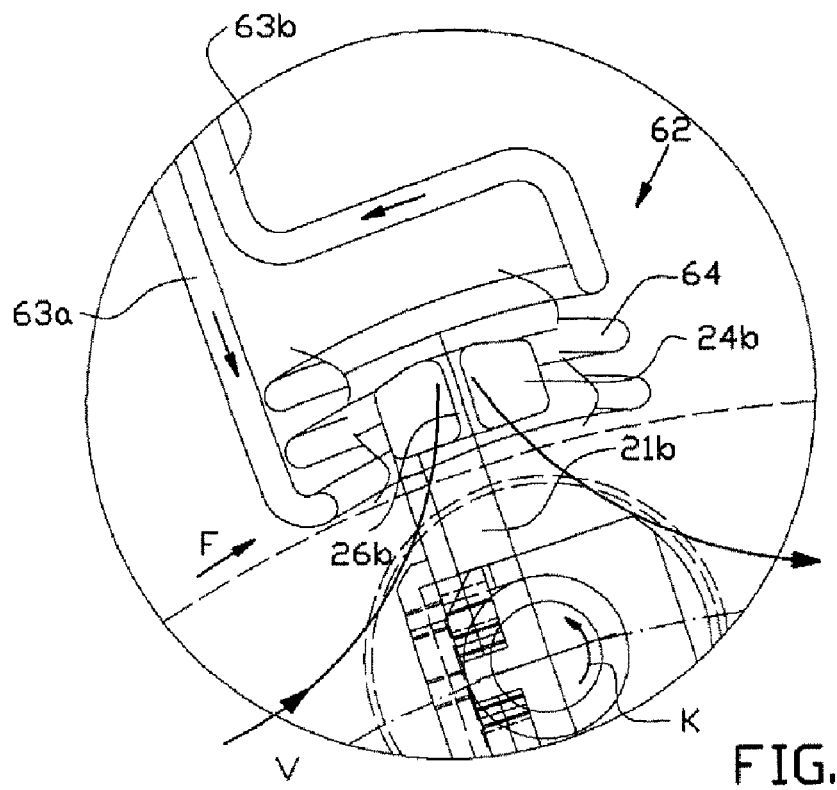
FIG. 2B shows a detail of the illustration in FIG. 2.

The coil 62 is positioned such that it can accommodate the clamping panel 24b of the wrapper 20 in its entirety, without contacting it. This is illustrated in more detail in FIG. 2B.

As can be seen in FIGS. 3A-C, the clamping panel 24b, attached to the wrapping arm 21b, is provided with a metal insert 27b, fixedly clamped in a slot 29 made in the clamping panel 24b. The clamping panel 24b is furthermore made from a suitable plastic material. The metal insert 27b can be made from RVS430, ferritic stainless steel. In this case, the insert 27b is provided with a slot 27c for a lollipop stick, similar to the clamping panel 24a opposite.

The metal is surrounded by the plastic of the clamping panel 24b in the lateral and backward direction and thus insulated.

The packaging device 1 furthermore comprises a fixedly arranged infrared sensor 80, which is positioned on the periphery of the movement path such that the clamping panel 24b comes within its measuring range. The infrared sensor 80 is connected by a line 81 to the control unit 66 in order to emit measurement signals thereto which are indicative of the temperature of the insert 27b of the clamping panel 24b. These are stored in a shift register 82 in the control unit 66.

As illustrated in FIG. 5, the infrared sensor 80 is arranged four positions upstream of the heating coil 62. The infrared sensor 80 could for example also be arranged two positions further downstream if that does not impede the introduction of the packaging film/foil and the lollipop. The number of positions of the shift register 82 is equal to that number of positions, in this example therefore four positions.

FIG. 5A shows the—in this case 10—pairs of clamping panels 24a,b (positions a-j), with the direction of movement F being shown by way of indication. The clamping panel pair 24a,b of position f is then at the coil 62. At the location of position b, a new measurement is taken on a clamping panel 24b.

The control unit 66 is connected via input 72 to a control panel 71 with which the desired value for the temperature for the insert 27b (e.g. the heating body) can be input into the control unit 66.

The control unit 66 furthermore comprises a port 69a, for the line 81 leading from the infrared sensor 80 to the shift register 82. The port 69b is connected to an induction heating unit 67 which activates the coil 62 via line 63a,b.

Using the control unit 66, in which every measured value can be stored, at least until the next heating cycle of the respective clamping jaw, it is thus in principle possible to heat each clamping jaw separately up to a desired temperature according to an individually adapted control of the heating means, in this case using the induction coil. Thus, it is possible to store the measured value for position b, for example, and when position b has arrived at the coil 62, to control the induction heating unit 67 in order to energize the induction coil 62 at the observed differential temperature, based on a comparison of the measured value stored in the shift register 82 for position b and the desired value, for example 130° C., proportionally, according to power and/or time. In a similar manner, the other clamps of the positions a and c-j are heated in turn, depending on the temperature measured for these individual clamping jaws thereof by infrared sensor 80 on the relevant inserts 27b. Such an arrangement may be feasible if the inserts 27b of all clamping panels 24b are exactly identical to one another.

FIG. 5B is identical to FIG. 5A except that it has been extended by a shift register 70, in which one or more values can be stored via port 68b for each position a-j relating to the state of the control unit, in particular the history of the state of the control system. The control unit 66 is able to read out the relevant information via port 68a and use it for the control of the induction heating device 67, also on the basis of the most recent measured value of infrared sensor 80 for the relevant position. Value(s) representative of the respective control of the induction heating device 67 are stored in the shift register 70, for use in later cycles for the relevant position.

This makes a control system using a kind of learning process possible for each position; if the measured temperature in one rotation for a specific position is lower or higher than in the previous rotation, this may be noticed by the control device 66 and the control of the induction heating device 67 can subsequently be adjusted.

As a result thereof, an accurate heating of each separate clamping panel 24b with an insert 27b can be achieved, not only with minimum deviations between the positions themselves, but also for each position over time.

In use, as diagrammatically illustrated in FIG. 2, the lollipops with film/foil sheet hanging from the head, the bending axis of which is parallel to the stick $S_1$, at the beginning of the section I, are received in the holders 50a, b of the fourth process wheel 11.

Using means not shown in any more detail, the film/foil sheet can be folded around the head to form a tube. In the meantime, the two wrappers 20, 30 are not yet active, but hot air pressed into section II, which, using means (not shown), such as pipes bent in accordance with the path of the film/foil sheet around the head, will be delivered in a directed manner to the portion of the film/foil sheet which protrudes from the head on the end remote from the stick, will ensure that the film/foil sheet is heated on the side of the head remote from the sticks. The clamping panel 24b of the wrapper 20, which follows the path V, will move into and out of the coil 62. The induction coil 62 is energized electrically by the induction heating device 60, as a result of which a magnetic field is generated within the coil 62. By suitable choice of the components of the induction heating device, the magnetic field will heat the metal insert 27b sufficiently for sealing purposes.

As soon as the clamping panel 24b is moved out of the coil 62 again, the wrappers 20 and 30 are moved to the operating position by means which are not shown (the aforementioned toothed racks), the clamping panels 24a, 24b and 34a, 34b clamping the film/foil sheet $F_1$ such that it is flat. By the engagement with the associated annular toothed racks (41), they are rotated continuously, while the film/foil tube with the lollipop head is held securely and permanently by the clamps 50a, 50b. As a result, twisted or wrapped film/foil tube sections are formed on both ends of the lollipop head K, the heated insert 27b ensuring that the film/foil material is heat-sealed locally at the stick $S_1$. On the other side, the preheated film/foil material will ensure that the twisted film/foil material between the clamping panels 34a, 34b and the head $K_1$ is heat-sealed. This is the end of the sealing and wrapping section III, and the double-twisted, packaged lollipop can be dispensed in section IV.

As the metal insert 27b is insulated by the plastic material against the clamping panel 24b towards the sides which are not to be used, it will be possible to retain the heat in the insert 27b to a large degree and during the next insertion in the induction coil 62, it will only need to be reheated, as has been explained above. The diffusion of heat in the drum is in this case limited to a minimum.

The invention claimed is:

1. A method of packaging items, comprising the steps of providing a conveying rotating driven drum having a series of holders for holding at least one item and at least one packaging sheet securely during conveying, feeding the at least one item and at least one packaging sheet to the packaging conveyor and discharging the at least one item packaged on the conveyor, closing the at least one packaging sheet on the respective item and heat-sealing and co-rotating with the holders for heat-sealing, the heat-sealing means comprising a sheet gripper which is provided with a heating body, heating each heating body and controlling the heating means, the control means comprising one control system, a memory for discrete storage of the measured values of the heating bodies and being provided with a memory for storing a desired value of the temperature of the heating bodies, measuring the temperature of each heating body, controlling the heating means by way of the control means for that heating body based on the result of a comparison between the desired value and the last measured value of a heating body.

2. The method of packaging items of claim 1, wherein the means for heating comprise induction heating means.

3. A device for packaging items, comprising a rotating driven drum having a series of holders for holding at least one item and at least one packaging sheet securely during conveying, a feed station for feeding the at least one item and the at least one packaging sheet to the packaging conveyor and a discharge station for discharging the at least one item packaged on the conveyor, the packaging conveyor being provided with means for closing the at least one packaging sheet on the respective item and with a series of heat-sealing means co-rotating with the holders for heat-sealing a closed packaging by supplying heat, each of the heat-sealing means comprising a sheet gripper which is provided with a heating body, the device furthermore comprising means for heating each heating body and means for controlling the heating means, the control means comprising one control system and being provided with a memory for storing a desired value of the temperature of the heating bodies, the device furthermore comprising a means for measuring the temperature of each heating body, the control means furthermore comprising a memory for discrete storage of the measured values of the heating bodies, the control means being designed for controlling the heating means for that heating body based on the result of a comparison between the desired value and the last measured value of a heating body.

4. The device according to claim 3, wherein the at least one item is a lollipop provided with a stick and a head.

5. The device according to claim 3, wherein the measuring means are stationary and designed for contactless measurement of the temperature from outside of the heating bodies.

6. The device according to claim 3, wherein the heating means and the measuring means are placed at regular intervals along the movement path of the holders.

7. The device according to claim 3, wherein each sheet gripper with heating body can be moved between a non-operating position and an operating position, the heat-supplying means being stationary and arranged such that heat is supplied to the heating body when the sheet gripper is in the non-operating position, measuring means preferably being arranged such that they measure the temperature of the heating body when the sheet grippers are in the non-operating position.

8. The device according to claim 7, wherein wrapping means and heat-sealing means are provided for each holder, the wrapping means and heat-sealing means preferably being designed such that they operate during conveying thereof through by the packaging conveyor.

9. The device according to claim 7, wherein the packaging conveyor is provided with wrapping means for forming a twisted end section of the packaging sheet while packaging the respective item and the heat-sealing means are arranged such that they heat-seal the twisted section or an adjoining region of the packaging sheet by supplying heat.

10. The device according to claim 7, wherein the sheet grippers comprise pairs of clamping arms which are arranged on the packaging conveyor so as to be able to rotate about an individual rotation shaft, the path of the rotation shaft being situated at a shortest distance from the heat-supplying means which is smaller than the clamping arm length.

11. The device according to claim 7, wherein wrapping means and heat-sealing means are positioned on the side of the lollipop head remote from the stick.

12. The device according to claim 11, wherein the clamping arms can be moved between an operating or clamping position directed at the rotation shaft and a projecting position or non-operating position directed away from the rotation shaft, the heat-supplying means being arranged in a section of the heat-sealing means, in which the clamping arms are in the projecting position, in which they extend preferably radially relative to the rotation shaft.

13. The device according to claim 11, wherein the clamping arms are rotatable about their rotation shaft in a direction counter to the direction of rotation of the packaging conveyor.

14. The device according to claim 3, wherein the packaging conveyor is provided with wrapping means for forming a twisted end section of the packaging sheet while packaging the respective item and the heat-sealing means are arranged such that they heat-seal the twisted section or an adjoining region of the packaging sheet by supplying heat.

15. The device according to claim 14, wherein the sheet grippers comprise pairs of clamping arms which are arranged on the packaging conveyor so as to be able to rotate about an individual rotation shaft, the path of the rotation shaft being situated at a shortest distance from the heat-supplying means which is smaller than the clamping arm length.

16. The device according to claim 14, wherein the sheet gripper may be provided with a layer of heat-insulating material which protects the heating body in a direction other than the clamping direction.

17. The device according to claim 3, wherein the sheet grippers comprise pairs of clamping arms which are arranged on the packaging conveyor so as to be able to rotate about an individual rotation shaft, the path of the rotation shaft being situated at a shortest distance from the heat-supplying means which is smaller than the clamping arm length.

18. The device according to claim 17, wherein the sheet gripper may be provided with a layer of heat-insulating material which protects the heating body in a direction other than the clamping direction.

19. The device according to claim 3, wherein the induction coil is arranged such that the coil shaft is transverse to the movement path of the holders.

20. The device according to claim 3, wherein the sheet gripper may be provided with a layer of heat-insulating material which protects the heating body in a direction other than the clamping direction.

21. The device according to claim 3, wherein the means for heating comprise induction heating means.

* * * * *